United States Patent
Afkhamie et al.

(10) Patent No.: US 8,537,705 B2
(45) Date of Patent: Sep. 17, 2013

(54) TRANSMIT POWER CONTROL

(75) Inventors: Hassan Kaywan Afkhamie, Ocala, FL (US); Srinivas Katar, Gainesville, FL (US); Anthony J. Cowan, Ocala, FL (US); Manjunath Krishnam, Gainesville, FL (US)

(73) Assignee: QUALCOMM Incorporated, San Diego, CA (US)

( * ) Notice: Subject to any disclaimer, the term of this patent is extended or adjusted under 35 U.S.C. 154(b) by 331 days.

(21) Appl. No.: 12/979,512

(22) Filed: Dec. 28, 2010

(65) Prior Publication Data
US 2011/0164514 A1 Jul. 7, 2011

Related U.S. Application Data

(60) Provisional application No. 61/292,105, filed on Jan. 4, 2010.

(51) Int. Cl.
*H04L 12/26* (2006.01)

(52) U.S. Cl.
USPC ........................................................ 370/252

(58) Field of Classification Search
USPC ........................................................ 370/252
See application file for complete search history.

(56) References Cited

U.S. PATENT DOCUMENTS

| | | | |
|---|---|---|---|
| 6,035,000 A | 3/2000 | Bingham | |
| 6,160,443 A | 12/2000 | Maalej et al. | |
| 6,278,685 B1 | 8/2001 | Yonge, III et al. | |
| 6,289,000 B1 | 9/2001 | Yonge, III | |
| 6,647,250 B1 | 11/2003 | Bultman et al. | |
| 7,684,756 B2 | 3/2010 | Bohnke et al. | |
| 7,904,021 B2 | 3/2011 | Yonge, III | |
| 2002/0015477 A1 | 2/2002 | Geile et al. | |
| 2002/0105901 A1 | 8/2002 | Chini et al. | |
| 2003/0016123 A1 | 1/2003 | Tagar et al. | |

(Continued)

FOREIGN PATENT DOCUMENTS

| | | |
|---|---|---|
| JP | 2009531996 A | 9/2009 |
| WO | WO2007024931 A2 | 3/2007 |
| WO | WO 2009150224 A1 * | 12/2009 |
| WO | 2011082145 | 7/2011 |

OTHER PUBLICATIONS

International Search Report dated Apr. 30, 2008 referencing PCT Application No. PCT/US2007/85189, 12 pages.

(Continued)

*Primary Examiner* — Kenny Lin
(74) *Attorney, Agent, or Firm* — DeLizio Gilliam, PLLC

(57) ABSTRACT

A method for communicating among nodes in a network includes determining, by a transmitter, a first frequency band and at least a second frequency band to be used for communicating data packets, wherein a maximum allowable power spectral density in the first frequency band is greater than a maximum allowable power spectral density in the second frequency band. The method also includes adjusting power spectral density for a first group of frequencies in the first frequency band such that the adjusted power spectral density of the first group does not exceed the maximum allowable power spectral density of the first frequency band and a quantization noise introduced by the transmitter is less than a threshold value for a signal transmitted in the second frequency band. The method further includes modulating at least a portion of a data packet transmitted by the transmitter to at least a first receiver in accordance with the adjusted power spectral density.

52 Claims, 10 Drawing Sheets

(56) References Cited

U.S. PATENT DOCUMENTS

| | | |
|---|---|---|
| 2003/0133473 A1 | 7/2003 | Manis et al. |
| 2004/0009783 A1 | 1/2004 | Miyoshi |
| 2005/0058089 A1 | 3/2005 | Vijayan et al. |
| 2005/0078803 A1 | 4/2005 | Wakisaka et al. |
| 2005/0099938 A1 | 5/2005 | Sarraf et al. |
| 2005/0135312 A1 | 6/2005 | Montojo et al. |
| 2005/0163067 A1 | 7/2005 | Okamoto |
| 2006/0083205 A1 | 4/2006 | Buddhikot et al. |
| 2006/0126493 A1 | 6/2006 | Hashem et al. |
| 2006/0256881 A1 | 11/2006 | Yonge, III et al. |
| 2007/0041429 A1* | 2/2007 | Khandekar .................. 375/146 |
| 2008/0107161 A1 | 5/2008 | Xu et al. |
| 2009/0010421 A1* | 1/2009 | Tlich et al. .................... 379/413 |
| 2011/0164670 A1* | 7/2011 | Abad Molina et al. ....... 375/227 |

OTHER PUBLICATIONS

PCT International Search Report for Application No. PCT/US06/29718; dated Sep. 21, 2007.

"Programmable PSD Mask", V1.1.1 (Feb. 2006); Proposed Technical Specification, European Telecommunications Standards Institute, available prior to Jun. 2006.

International Search Report—PCT/US2010/062186—ISA/EPO—Sep. 27, 2011.

"PCT Application No. PCT/US2010/062186 International Preliminary Report on Patentability", Dec. 18, 2012 , 4 pages.

* cited by examiner

TRANSMIT POWER CONTROL

CROSS-REFERENCE TO RELATED APPLICATIONS

This application claims priority to U.S. Application Ser. No. 61/292,105, filed on Jan. 4, 2010, incorporated herein by reference.

TECHNICAL FIELD

This description relates to nodes connected in a network communicating with each other. In particular, this description is directed to controlling the transmission power of a transmitter in the network.

BACKGROUND

For communication systems, regulatory constraints typically limit the maximum power spectral density a device can utilize at any given frequency. For example, in North America regulatory constraints can be interpreted to impose a maximum allowable PSD of −50 dBm/Hz in the 2-30 MHz range and −80 dBm/Hz in the 30-88 MHz range. If a single digital-to-analog converter is used in a transmitter to generate a wideband signal that spans the frequency range 2-88 MHz, then the signal above 30 MHz is represented by fewer discrete levels as compared to the signal in the 2-30 MHz frequency range. The signal in the 30-88 MHz band therefore suffers from higher quantization noise and limited fidelity. Similarly, if a single analog-to-digital converter is used at the receiver to process the wideband received signal, the quantization noise for the signal in the 30-88 MHz band is higher as compared to the signal in the 2-30 MHz band.

SUMMARY

In one aspect a method for communicating among nodes in a network includes determining, by a transmitter, a first frequency band and at least a second frequency band to be used for communicating data packets, wherein a maximum allowable power spectral density in the first frequency band is greater than a maximum allowable power spectral density in the second frequency band. The method also includes adjusting power spectral density for a first group of frequencies in the first frequency band such that the adjusted power spectral density of the first group does not exceed the maximum allowable power spectral density of the first frequency band and a quantization noise introduced by the transmitter is less than a threshold value for a signal transmitted in the second frequency band. The method further includes modulating at least a portion of a data packet transmitted by the transmitter to at least a first receiver in accordance with the adjusted power spectral density.

In another aspect a system for communicating among nodes in a network includes a transmitter configured to determine a first frequency band and at least a second frequency band to be used for communicating data packets, wherein a maximum allowable power spectral density in the first frequency band is greater than a maximum allowable power spectral density in the second frequency band. The transmitter is also configured to adjust power spectral density for a first group of frequencies in the first frequency band such that the adjusted power spectral density of the first group does not exceed the maximum allowable power spectral density of the first frequency band and a quantization noise introduced by the transmitter is less than a threshold value for a signal transmitted in the second frequency band. The transmitter can also modulate at least a portion of a data packet in accordance with the adjusted power spectral density.

In another aspect a method for communicating among nodes in a network includes determining, by a transmitter, a data rate to be used for communicating data packets with at least a first receiver in the network, wherein the data rate is chosen from a set of predetermined data rates. The method also includes adjusting power spectral density for a group of frequencies such that the adjusted power spectral density of the group does not exceed the maximum allowable power spectral density for the group. The method further includes modulating at least a portion of a data packet transmitted by the transmitter in accordance with the adjusted power spectral density.

In still another aspect a system for communicating among nodes in a network includes a transmitter configured to determine a data rate to be used for communicating data packets with at least a first receiver in the network, wherein the data rate is chosen from a set of predetermined data rates. The transmitter further adjusts power spectral density for a group of frequencies such that the adjusted power spectral density of the group does not exceed the maximum allowable power spectral density for the group. The transmitter also modulates at least a portion of a data packet in accordance with the adjusted power spectral density.

Implementations can include one or more of the following. The data packet transmitted by the transmitter can include a payload and overhead information. At least a portion of the overhead information or payload is transmitted in the first frequency band. The power spectral density is adjusted such that at least a second receiver is able to receive the overhead information. The second receiver can be configured to determine from the overhead information whether the transmitter is communicating with at least the first receiver. The transmitter may determine a minimum power level for transmitting the overhead information such that at least the second receiver is able to receive the overhead information. The transmitter can monitor transmissions to all other nodes in the network, wherein the other nodes include at least the first and second receivers. The transmitter can also monitor receptions from all other nodes in the network. The transmitter can poll at least the second receiver to determine if the second receiver is able to receive the overhead information. The overhead information can include a preamble and one or more frame control bits. The power spectral density for a second group of frequencies can be adjusted such that the adjusted power spectral density in the second group does not exceed the maximum allowable power spectral density of the second frequency band. The first group can include the entire first frequency band, the second group can include the entire second frequency band and the adjustments made to the first group can be substantially same as the adjustments made to the second group. The transmitter can determine a third frequency band to be used for communicating the data packets, wherein a maximum allowable power spectral density in the third frequency band is less than the maximum allowable power spectral density in the second frequency band, and adjust power spectral density for at least one of the first and second groups of frequencies such that the quantization noise introduced by the transmitter is less than a second threshold value for a signal transmitted in the third frequency band. The quantization noise can be introduced by a digital to analog converter of the transmitter. The same digital to analog converter can be used for signals both in the first and second frequency bands as well as the entire frequency band of interest. The power spectral density for the first group can be further adjusted in accordance with at least one of a received power spectral density at the input of the first receiver and noise introduced in a channel between the transmitter and the first receiver. The power spectral density for the first group can be adjusted to increase a data rate between the transmitter and the first receiver. The channel between the transmitter and the first receiver can have frequency selective noise and attenuation characteristics, and the power spectral density for the first group can be adjusted in accordance with the frequency selective noise and attenuation characteristics. The power spectral density for the first group can be further adjusted such that a second quantization noise introduced by an analog to digital converter in the first receiver is below a third threshold. The power spectral density for the first group can be further adjusted such that transmissions within the network are not received by at least one node in a neighboring second network. Training packets can be sent by the transmitter to other nodes in the network in at least the first and second frequency bands. The transmitter can receive corresponding tone maps from the other nodes responsive to the training packets. The power spectral density for the first group can be further adjusted based on available a priori information about the network. The a priori information can include one or more of a nature of a link between two nodes in the network, signal to noise ratios (SNR) of various carrier frequencies between the nodes in the network, modulation schemes to be used for each carrier frequency, a code rate and a guard interval to be used by the transmitter, and limitations of hardware used in the network. The power spectral density for the first group can be further adjusted based on feedback information received from at least the first receiver, the feedback information indicating a need to either increase or decrease transmit power. The data rates between the transmitter and other nodes in the network can be fixed and/or predetermined.

Other aspects and advantages will be apparent from the detailed description, drawings, appendices and claims.

DETAILED DESCRIPTION

System Overview

Figure 1:
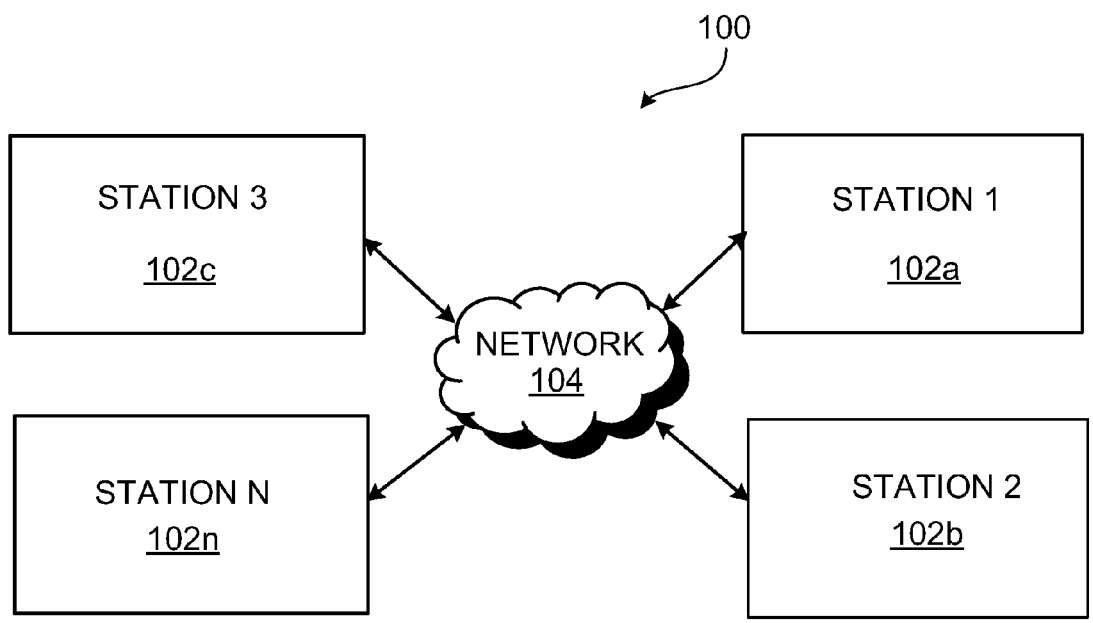
FIG. 1 is a schematic diagram of a communication network.

FIG. 1 shows a system 100 of an exemplary network configuration for a plurality of nodes (called "stations") communicating with each other. In broad overview, the system 100 includes a plurality of stations 102*a*-102*n* communicating with each other over a network 104. The network 104 may include one or more different types of network. For example, the network 104 may include a local area network (LAN), such as a company intranet or a home network. In some implementations, the network 104 may include a metropolitan area network (MAN) or a wide area network (WAN) such as the Internet. In other implementations, the network 104 may include a combination of one or more different types of network. For example, a LAN such as the home network may be connected to an external access network. In such cases, one or more gateway devices may act as interfaces between two different networks.

In some implementations, the network 104 comprises one or more network devices connected to a shared medium such as a phone line network or a coaxial cable network. The one or more network devices may be connected via one or more gateway devices to an external network such as the internet. The gateway device may be connected by any type and form of connection to the external network including a broadband connection or a dialup connection. The gateway device may be connected via one or more bridges to other home network segments. The home network segments may be based on a home networking technology such as one based on power line networks.

The network 104 can be of any type and form and may include any of the following: a point to point network, a broadcast network, a computer network, a power line network, an Asynchronous Transfer Mode (ATM) network, a Synchronous Optical Network (SONET), a Synchronous Digital Hierarchy (SDH) network, a wireless network and a wired network. If the network 104 is at least in part a wired network, the network 104 may include one or more of the following: coaxial cable, power line wires, twisted pair wires or any other form and type of wire. The topology of the network 104 may be a bus, star or a ring topology or any other topology capable of supporting the operations described herein.

In some implementations, the network 104 may be a Broadband Power Line Network (BPLN) that provides access to a backhaul network. A BPLN can be managed by a service provider entity having access to the underlying physical power line medium. A BPLN is a general purpose network that can be used for several types of applications including, smart grid management, broadband internet access, voice and video delivery services, etc. In various implementations, a BPLN can be deployed on low voltage, medium voltage and high voltage power lines. Additionally, a BPLN can span an entire neighborhood or it may be deployed within a single multi-dwelling unit. For example, it can be used to provide network service to tenants in a single apartment building. While power lines are one medium for deploying the BPLN, similar techniques can be deployed on other wire lines, such as, for example, coaxial cables, twisted pair or a combination thereof.

In general, the system 100 includes a plurality of stations 102*a*-102*n* (102 in general). In some implementations, the stations 102 may be stations in a BPLN that can share certain functionality such as a common security protocol. In some implementations, the stations 102 may include a Head End (HE), Repeaters (R), and Network Termination Units (NTUs). In other implementations, various types of Customer Premises Equipment (CPE) stations (e.g., a computer) can be used as endpoint nodes in the network. Such stations may communicate with other nodes in the network through one or more of the NTU, any number of repeaters, (e.g., including no repeaters), and the Head End.

In some implementations, the stations 102 may be nodes of a home network (HN) communicating with each other using a home networking technology. The stations 102 may communicate with each other using any of a variety of communication protocols. In one implementation, each node in the network may communicate as a communication "station" using a PHY layer protocol that is used by the nodes to send transmissions to any other stations that are close enough to successfully receive the transmissions. Stations that cannot directly communicate with each other may use one or more repeater stations to communicate with each other. In some implementations, one of the stations 102a may act as a master node or station that controls, at least in some way, the other stations 102. In other implementations, there may be more than one master node in a network 104. In such cases, the more than one master node may share responsibilities or work in cooperation with each other. In some implementations, the master node(s) 102a may need to receive overhead information transmitted by any other station 102 in the network 104.

In some implementations, the stations 102 communicate with each other using data units or data packets. In some of these implementations, the data units may be transmitted over phone wire media, power line cables or coaxial cables, for example, using a physical layer protocol as a Physical Layer Protocol Data Unit (PPDU). The data units or packets may include a payload part with information to be delivered to a station and may include overhead information. The payload part may include, for example, application data and/or management information, (e.g., in some cases, in the form of a packet of a higher layer protocol). The overhead information may include information associated with encoding or modulation of information in the payload or with a communication protocol used by the stations in the network. The overhead information may include, for example, a preamble used to detect the start of the data unit, a header (also called a frame control field) after the preamble and before the payload, and a trailing check sequence after the payload used to check the integrity of the transmission. As described in more detail below, in some cases, some or all of the overhead information can be included as part of the payload according to a given scheme for modulating the payload.

Any of a variety of communication system architectures can be used to implement the portion of the network interface module that converts data to and from a signal waveform that is transmitted over the communication medium. An application running on a station provides and receives data to and from the network interface module in segments. A "MAC Service Data Unit" (MSDU) is a segment of information received by the MAC layer. The MAC layer can process the received MSDUs and prepares them to generate "MAC protocol data units" (MPDUs). An MPDU is a segment of information including a header (e.g., with management and overhead information) and payload fields that the MAC layer has asked the PHY layer to transport. An MPDU can have any of a variety of formats based on the type of data being transmitted. A "PHY Protocol Data Unit (PPDU)" refers to the modulated signal waveform representing an MPDU that is transmitted over the power line by the physical layer.

Apart from generating MPDUs from MSDUs, the MAC layer can provide several functions including channel access control, providing the required QoS for the MSDUs, retransmission of corrupt information, routing and repeating. Channel access control enables stations to share the power line medium. Several types of channel access control mechanisms such as carrier sense multiple access with collision avoidance (CSMA/CA), centralized Time Division Multiple Access (TDMA), distributed TDMA, token based channel access, etc., can be used by the MAC. Similarly, a variety of retransmission mechanism can also be used. The Physical layer (PHY) can also use a variety of techniques to enable reliable and efficient transmission over the transmission medium (power line, coax, twisted pair etc). Various modulation techniques such as Orthogonal Frequency Division Multiplexing (OFDM), Wavelet modulations can be used. Forward error correction (FEC) codes, line Viterbi codes, Reed-Solomon codes, concatenated codes, turbo codes, low density parity check code, etc., can be employed by the PHY to detect and correct errors in transmission.

Some implementations of the PHY layer use OFDM modulation. In OFDM modulation, data are transmitted in the form of OFDM "symbols." Each symbol has a predetermined time duration or symbol time $T_s$. Each symbol is generated from a superposition of N sinusoidal carrier waveforms that are orthogonal to each other and form the OFDM carriers. Each carrier has a peak frequency $f_i$ and a phase $\Phi_i$ measured from the beginning of the symbol. For each of these mutually orthogonal carriers, a whole number of periods of the sinusoidal waveform is contained within the symbol time $T_s$. Equivalently, each carrier frequency is an integral multiple of a frequency interval $\Delta f=1/T_s$. The phases $\Phi_i$ and amplitudes $A_i$ of the carrier waveforms can be independently selected (according to an appropriate modulation scheme) without affecting the orthogonality of the resulting modulated waveforms. The carriers occupy a frequency range between frequencies $f_1$ and $f_N$ referred to as the OFDM bandwidth.

Figure 2:
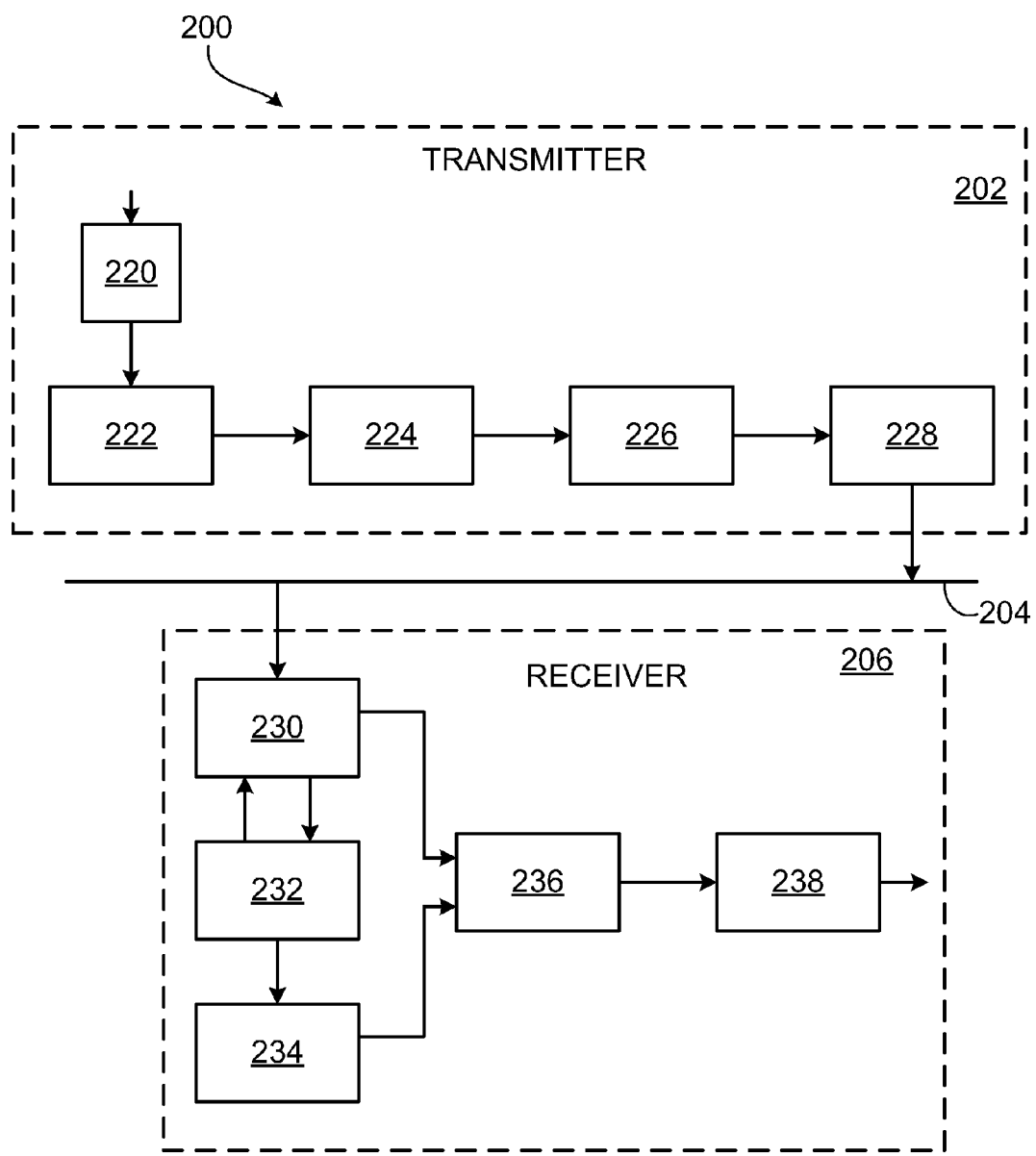
FIG. 2 is a block diagram of a communication system for communicating over the network.

Referring to FIG. 2, a communication system 200 includes a transmitter 202 for transmitting a signal (e.g., a sequence of OFDM symbols) over a communication medium 204 to a receiver 206. The transmitter 202 and receiver 206 can both be incorporated into a network interface module at each station (e.g., stations 102a-102n). The communication medium 204 can represent a path from one device to another over the power line network.

At the transmitter 202, modules implementing the PHY layer receive an MPDU from the MAC layer. The MPDU is sent to an encoder module 220 to perform processing such as scrambling, error correction coding and interleaving.

The encoded data is fed into a mapping module 222 that takes groups of data bits (e.g., 1, 2, 3, 4, 6, 8, or 10 bits), depending on the constellation used for the current symbol (e.g., a BPSK, QPSK, 8-QAM, 16-QAM constellation), and maps the data value represented by those bits onto the corresponding amplitudes of in-phase (I) and quadrature-phase (Q) components of a carrier waveform of the current symbol. This results in each data value being associated with a corresponding complex number $C_i=A_i \exp(j\Phi_i)$ whose real part corresponds to the I component and whose imaginary part corresponds to the Q component of a carrier with peak frequency $f_i$. Alternatively, any appropriate modulation scheme that associates data values to modulated carrier waveforms can be used.

The mapping module 222 also determines which of the carrier frequencies $f_1, \ldots, f_N$ within the OFDM bandwidth are used by the system 200 to transmit information. For example, some carriers that are experiencing fades can be avoided, and no information is transmitted on those carriers. Instead, the mapping module 222 uses coherent BPSK modulated with a binary value from the Pseudo Noise (PN) sequence for that carrier. For some carriers (e.g., a carrier i=10) that correspond to restricted bands (e.g., an amateur radio band) on a medium 204 that may radiate power, no energy is transmitted on those carriers (e.g., $A_{10}=0$). The mapping module 222 also determines the type of modulation to be used on each of the carriers (or "tones") according to a "tone map." The tone map can be a default tone map, or a customized tone map determined by the receiving station, as described in more detail below.

An inverse discrete Fourier transform (IDFT) module 224 performs the modulation of the resulting set of N complex numbers (some of which may be zero for unused carriers) determined by the mapping module 222 onto N orthogonal carrier waveforms having peak frequencies $f_1, \ldots, f_N$. The modulated carriers are combined by IDFT module 224 to form a discrete time symbol waveform S(n) (for a sampling rate $f_R$), which can be written as $$S(n) = 10 \sum_{i=1}^{N} A_i \exp[j(2\pi in/N + \Phi_i)] \quad \text{Eq. (1)}$$

where the time index n goes from 1 to N, Ai is the amplitude and $\Phi_i$ is the phase of the carrier with peak frequency $f_i=(i/N) f_R$, and $j=\sqrt{-1}$. In some implementations, the discrete Fourier transform corresponds to a fast Fourier transform (FFT) in which N is a power of 2.

A post-processing module 226 combines a sequence of consecutive (potentially overlapping) symbols into a "symbol set" that can be transmitted as a continuous block over the communication medium 204. The post-processing module 226 prepends a preamble to the symbol set that can be used for automatic gain control (AGC) and symbol timing synchronization. To mitigate intersymbol and intercarrier interference (e.g., due to imperfections in the system 200 and/or the communication medium 204) the post-processing module 226 can extend each symbol with a cyclic prefix that is a copy of the last part of the symbol. The post-processing module 226 can also perform other functions such as applying a pulse shaping window to subsets of symbols within the symbol set (e.g., using a raised cosine window or other type of pulse shaping window) and overlapping the symbol subsets.

An Analog Front End (AFE) module 228 couples an analog signal containing a continuous-time (e.g., low-pass filtered) version of the symbol set to the communication medium 204. The effect of the transmission of the continuous-time version of the waveform S(t) over the communication medium 204 can be represented by convolution with a function g(τ;t) representing an impulse response of transmission over the communication medium. The communication medium 204 may add noise n(t), which may be random noise and/or narrowband noise emitted by a jammer.

At the receiver 206, modules implementing the PHY layer receive a signal from the communication medium 204 and generate an MPDU for the MAC layer. An AFE module 230 operates in conjunction with an Automatic Gain Control (AGC) module 232 and a time synchronization module 234 to provide sampled signal data and timing information to a discrete Fourier transform (DFT) module 236.

After removing the cyclic prefix, the receiver 206 feeds the sampled discrete-time symbols into DFT module 236 to extract the sequence of N complex numbers representing the encoded data values (by performing an N-point DFT). Demodulator/Decoder module 238 maps the complex numbers onto the corresponding bit sequences and performs the appropriate decoding of the bits (including de-interleaving and descrambling).

Any of the modules of the communication system 200 including modules in the transmitter 202 or receiver 206 can be implemented in hardware, software, or a combination of hardware and software.

Home networking systems commonly use the phone lines, power lines or coaxial cables inside the house as a communication medium. In some cases, there could be variation in signal attenuation and noise characteristics between various pairs of nodes. In such cases, home network systems may use channel adaptation procedures that enable selection of unique physical layer encoding parameters (e.g., modulation rate and forward error correction code rate) between a given pair of nodes. This approach enables optimization of the physical data rate that can be achieved between the pair of nodes according to current channel characteristics.

In some implementations, the channel characteristics depend on an attenuation (and distortion) of the signal as it propagates from the transmission to the receiver. In other implementations, the channel characteristics may depend on noise within the network. The combined effect of signal attenuation (and distortion) and noise may determine the physical layer data rates that may be achieved between a pair of nodes. Higher physical data rates allow for more demanding and/or data intensive applications to be supported. The channel characteristics may also determine quality of a channel or how reliably information is transmitted across the channel. Indicators and measures of quality may include, for example, bit error rate (BER) or symbol error rate (SER). In general, a low quality channel is prone to distorting the messages it conveys while a high quality channel preserves the integrity of the messages it conveys. In some implementations, the quality of the channel in use between communicating entities governs the probability of the destination correctly receiving the message from the source.

Transmit Power Control

Figure 3A:
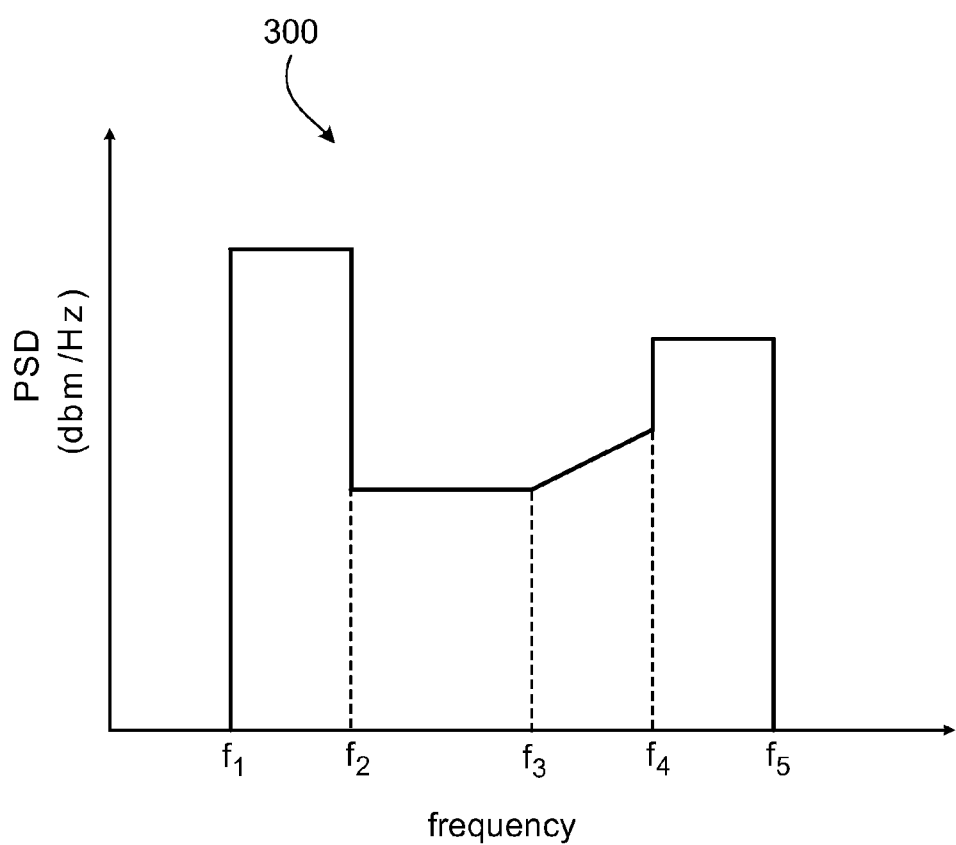
FIGS. 3A-3D are examples of power spectrum density profiles.

Referring now to FIG. 3A, a power spectrum density (PSD) profile 300 represents an exemplary distribution of allowable maximum transmission power for a communication system. In the example, frequency bands (f1-f2), (f2-f3) and (f4-f5) have a flat PSD, while the PSD in the frequency band (f3-f4) varies linearly with frequency. In general the PSD can be different at different frequencies and together define a PSD profile for a given frequency band.

Figure 3B:
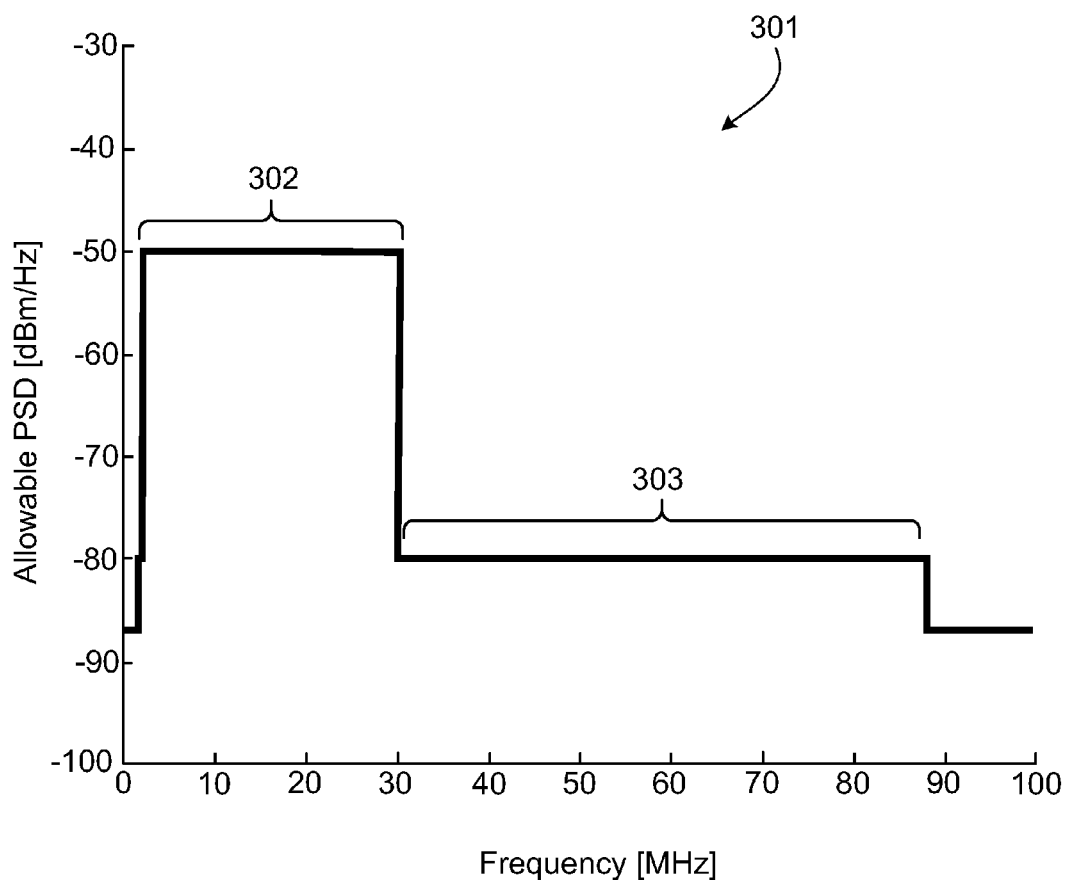

For most communication systems, regulatory authorities, such as the Federal Communications Commission (FCC) in the United States, stipulate emission limits (radiated, conducted or other) that in turn impose limits on power transmitted from a device. Typically, a manufacturer of communications equipment derives a maximum allowable PSD profile from the regulatory limitations. An example of such a profile 301 is shown in FIG. 3B. The PSD profile 301 represents a maximum allowable PSD for power line communication systems, to meet the regulations for a certain frequency band (0-100 MHz, in this example) in North America. In this example, the transmission power limit is substantially equal to −50 dBm/Hz in the band 302, and substantially equal to −80 dBm/Hz in the band 303. Even though the example shows a frequency band 0-100 MHz, communication systems such as power line communication systems can operate in other frequency bands including bands above 100 MHz.

Figure 3C:
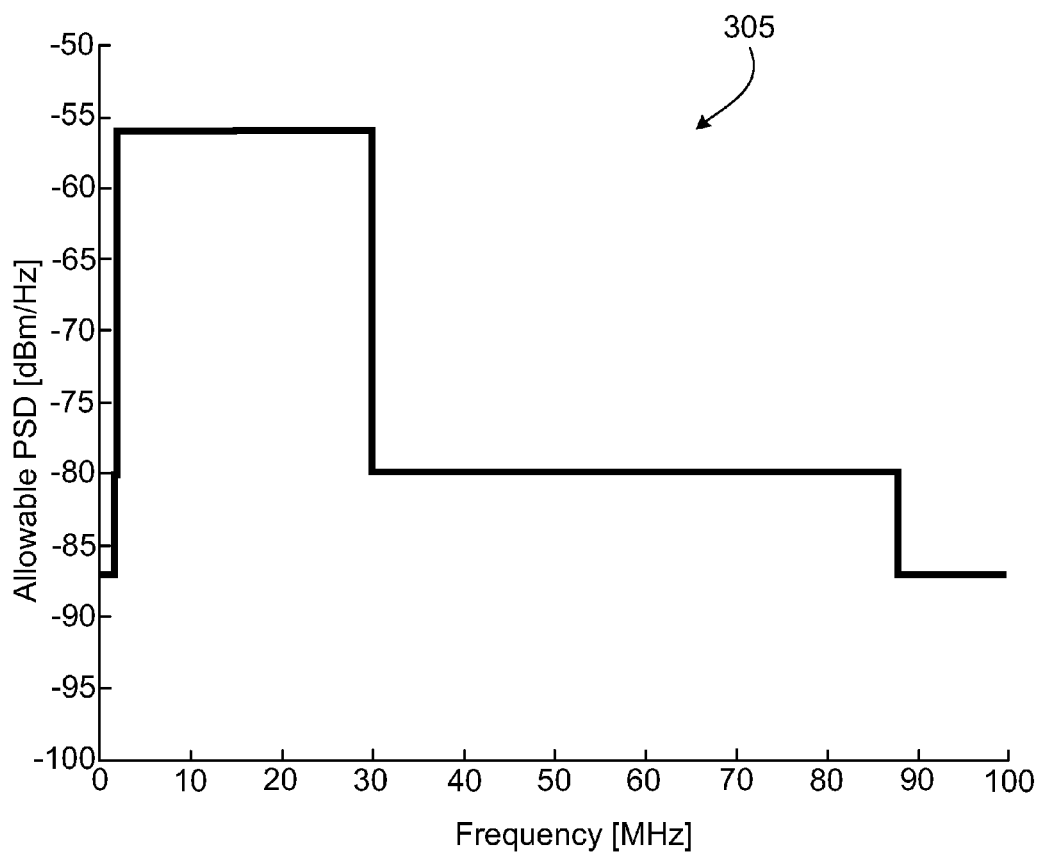
Figure 3D:
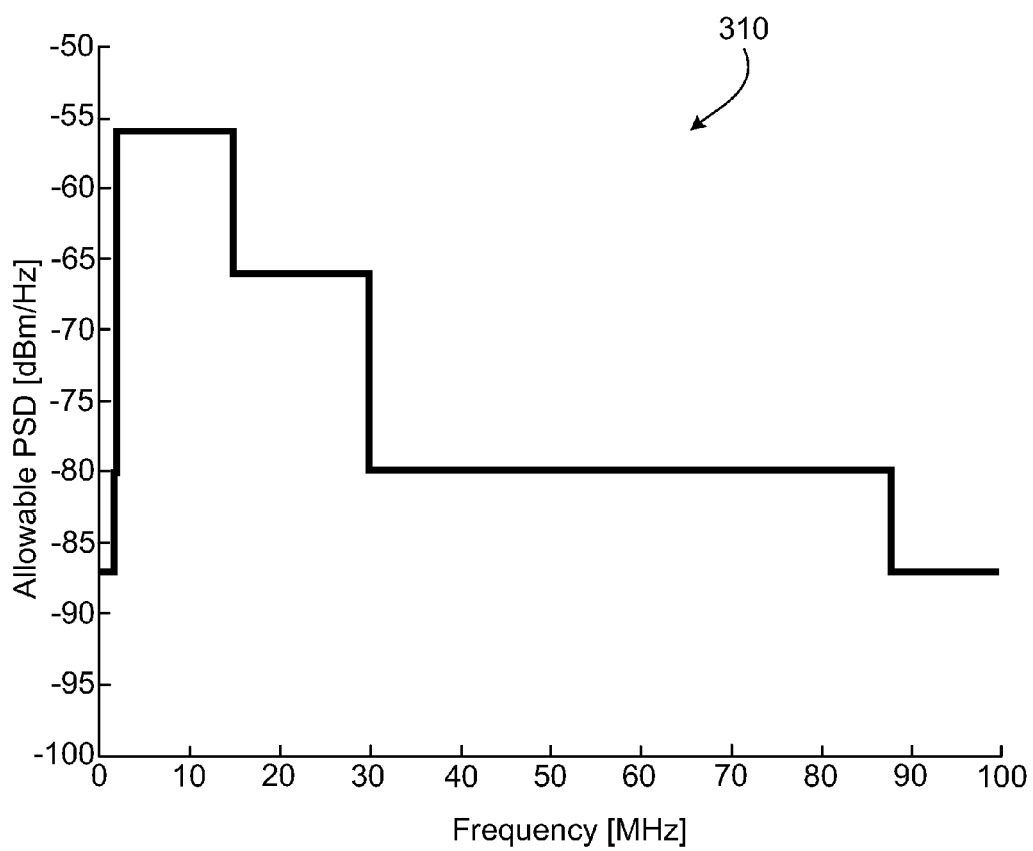

Referring now to FIGS. 3C-3D, further examples of PSD profiles are shown. For example, the PSD profile 305 in FIG. 3C represents a maximum allowable PSD for power line communication systems in Europe while the PSD profile 310 in FIG. 3D represents a maximum allowable PSD for power line communication systems in Japan. Even though the shape of the PSD profile 305 is similar to the shape of the PSD profile 301, the transmission power limit in the 2-30 MHz range is less than −55 dBm/Hz for the PSD profile 305. The PSD profile 310 represents further limitations in the 15-30 MHz range where the maximum allowable power is stipulated to be substantially equal to −66 dBm/Hz.

From the PSD profiles depicted in FIGS. 3A-3D, it can be seen that transmission powers used for communication between nodes of a network depend on the frequency being used for such a communication. For example, referring back to FIG. 3B, a signal whose frequency lies in the frequency band 302 can be transmitted with a maximum PSD of −50 dBm/Hz while a signal whose frequency is in the band 303, can be transmitted with a maximum PSD of only −80 dBm/Hz.

In general, transmitting at the maximum allowable power (or PSD) for a given frequency results in the best throughput for that frequency. However, in some implementations, it may be desirable to reduce the PSD to a level less than the maximum allowable level for that frequency. For example, consider the frequency bands 302 and 303 in FIG. 3B. If the same hardware, for example, a single digital-to-analog converter, is used in a transmitter to generate a wideband signal that spans the entire frequency range and uses the maximum allowable level in each band, then the signal in the frequency band 303 will be represented with fewer discrete levels than the signal in the frequency band 302. This, in turn will result in higher quantization noise and limited fidelity for the signal in the frequency band 303. In some cases, the quantization noise may be amplified when the signal, irrespective of the amplitude, is scaled at the input of the digital to analog converter to span the entire input range of the converter. The same principle also applies at the receiving converter that converts the analog received signal into digital levels. In some implementations, the errors arising due to increased quantization noise can be mitigated by reducing the power or PSD in the frequency band 302. Such reduction in the PSD of the band 302 results in a lower difference with the PSD of the band 303, thereby reducing the effect of the quantization noise. For example, if the PSD difference is reduced by 6 dB, the quantization noise in the band 303 is halved. In other words, depending on the communication channel between two nodes of a network, it can be advantageous to reduce transmit power on some frequencies to gain fidelity in the converters.

Controlling the transmission power can also be advantageous in other ways. For example, reduction in transmit power of a device reduces the device's power consumption during transmissions. This is particularly of interest in situations where there is excess bandwidth on a particular communication link. In such situations, the transmit power can be reduced to save energy without sacrificing the quality of communication to a large extent.

In some implementations, transmit power control may also be used for separating two or more networks. Consider two networks in substantially close proximity to each other. For example, one network may include devices in a given house coupled with each other via a power line network. There may be a similar network of devices in the neighboring house and in some cases, the two networks can interfere with each other's transmissions. In such cases, transmit power control can be employed to reduce transmission power to a level where it cannot be received by a device in a neighboring network, thereby creating sufficient separation between the neighboring networks.

Figure 4:
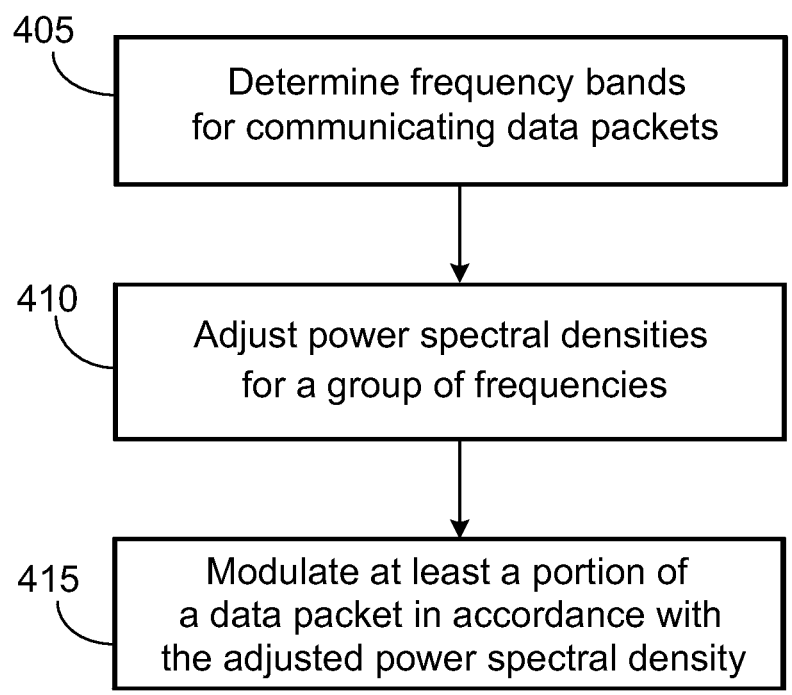
FIG. 4 is a flow diagram depicting example operations at a transmitter.

Referring now to FIG. 4, a flowchart represents a particular arrangement of operations at a transmitter to control transmission power. In some implementations, such operations allow one or more of power savings at the transmitter, spectral shaping of transmitted signals and optimization of a link between the transmitter and another node or receiver in the network.

Operations include determining one or more frequency bands for communicating data packets between the transmitter and one or more receivers in the network (step 405). Such determination allows the transmitter to figure out the best set of frequencies that can be used to communicate with one or more receivers. In some implementations, such determination also allows the transmitter to decide whether the transmit power can be feasibly reduced in one or more frequencies used in the transmissions. In some cases, the transmitter also determines which frequencies or frequency bands can be subjected to transmit power control.

Determination of the frequencies or frequency bands for communication can be done in various ways. In some implementations, the transmitting node or transmitter sends special type of training signals to the receivers. The training signals (or SOUND packets, as they are sometimes referred to as) are sent as data packets over a specific range or band of frequencies and meet the maximum transmit PSD requirements. In some implementations, a transmitting node can have a finite set of frequency bands to choose from. In such cases, the node sends the training signals or SOUND packets at each of the frequency bands. The receivers in the network monitor these packets and gather signal to noise ratio (SNR) of the various carriers in the frequency range or band. In some implementations, the receivers use this SNR information to determine various parameters such as the type of modulation to be used per carrier, the code rate to be used and the guard interval to be used by the transmitter. The collective information is referred to as a tone map which is sent to the transmitter in response to receiving the training signal. In some implementations, the transmitting node uses the tone map from a given receiver to determine the frequency bands to be used between the transmitter and the given receiver. For example, the transmitter may select a frequency band and the transmit power spectrum to maximize a data rate between the transmitter and a receiver. In some implementations, the frequency bands for communication are chosen based on the shape of the PSD profile of the spectrum. In some implementations, a first frequency band and at least a second frequency band is chosen such that the maximum allowable PSD in the first frequency band is greater than a maximum allowable PSD in the second frequency band. In some implementations, other frequency bands with different levels of PSD may also be chosen.

Operations further include adjusting the PSD for a group of frequencies used for transmission of data packets between the transmitter and the receiver (step 410). The group of frequencies for which the PSD is adjusted may be chosen in various ways. In some implementations, the group is chosen such that all the frequencies are in the frequency band with the highest allowable PSD. In some implementations, the group is chosen in such a way that at least some of the frequencies are in the frequency band with the highest allowable PSD while other frequencies in the group are in frequency bands with relatively lower allowable PSD.

The PSD for the group of frequencies may be adjusted in a variety of ways. In some implementations, the PSD in the frequency band with the highest allowable PSD is reduced such that the difference in PSD with other bands are reduced. For example, referring back to FIG. 3B, a reduction of 20 dBm/Hz in the frequency band 302 reduces the transmit PSD in the band 302 to −70 dBm/Hz, thereby reducing the difference in PSD with the frequency band 303 to 10 dBm/Hz as opposed to the original difference of 30 dBm/Hz. When a same set of hardware (for example, a digital to analog converter (DAC) or an analog to digital converter (ADC) that uses a particular set of quantization levels) is used to process signals for all frequencies, such a reduction in the PSD difference between the bands 302 and 303 results in lower quantization errors for the signals transmitted in the frequency band 303. In general, there may be more than two frequency bands. Regardless of the number of frequency bands or discrete frequencies, if a same set of hardware is used for processing signals for all frequency bands or frequencies, the quantization errors will be less if the transmit PSDs are close to each other. In other words, the flatter the transmit PSD profile, the lesser will be the quantization errors. However, reducing the transmit PSD also results in lower total transmitted power thereby lowering the signal to noise ratio (SNR). Therefore, in some implementations, reducing the transmit PSD represents a tradeoff between quantization noise and other noise such as noise introduced by the channel between the transmitter and the receiver. In general, the PSD in a frequency band is reduced such that the quantization error in a band with lower allowable PSD is less than a threshold value while the overall SNR is also in an acceptable range.

Transmit power control can be employed to improve the performance of a particular link, i.e., a communication channel between a transmitter and a given receiver. Various techniques can be used to determine the best transmit power spectrum suitable for a link. In some implementations, tone maps as described above, can be used for that purpose. For example, a transmitter can transmit the training signals or SOUND packets at the various available power levels and receive tone maps in response. From the tone maps, the transmitter can compare the link quality for all the different power levels. The power level that yields the highest link speed can then be chosen.

Determining the appropriate transmit spectrum by testing each of the available transmit power spectrums separately may require significant overhead. In some implementations, available a priori information regarding the behavior of the communication system can be used to make the search for an appropriate transmit level more efficient. For example, suppose for a particular communication system it is known that links performing below X Mbps when at full power do not benefit from any power level reduction. This information can be used in a protocol to determine the appropriate power level. For example, the search algorithm may simply terminate when it is recognized that a communication link operates below the X Mbps threshold at full transmit power. In some implementations, the transmitting node can send different groups of training signals or SOUND packets, with each group spanning different frequency ranges. In addition the transmitter can also send a group of SOUND packets spanning the entire operating frequency range. The receiver can determine SNR information obtained from each group of SOUND packets to initially determine whether transmit power control may be used. On such determination, the receiver may use additional a priori knowledge to determine a suitable transmit power spectrum. Examples of a priori information include but are not limited to: the maximum power level in each of the individual bands and the limitations of the hardware such as the ADC and DAC. In some implementations, the receiver communicates the transmit power spectrum to the transmitter. In some implementations, the receiver transmits feedback information based on which the transmitter can determine the transmit power spectrum.

In some implementations, a receiving node periodically broadcasts packets intended for network management (for example, discover beacons on HomePlug AV). Other nodes in the network can monitor the reception quality of these packets. Information derived from the reception quality of the packets is used as a priori information to determine whether the other nodes need to increase or reduce the transmit power for transmissions intended for the receiving node.

Figure 5A:
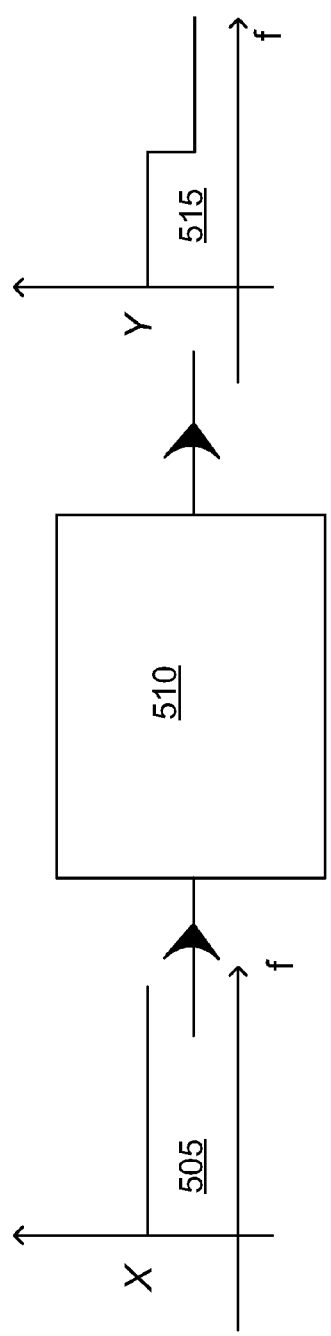
FIGS. 5A-5B are block diagrams depicting changes in power spectral density profiles introduced by a system.

In some implementations, the transmit PSD can be adjusted to compensate for non-linearity introduced by a system in the link between the transmitter and the receiver. FIG. 5A illustrates a case where non-linearity or distortion in the transmit PSD is introduced by a system 510. The system 510 can be a channel or link between the transmitter and receiver that introduces frequency selective fading, attenuation or distortion in the transmitted PSD profile. In the example shown in FIG. 5A, the flat transmit PSD 505 is acted on by the system or channel 510 and is received at the receiver with a distorted PSD 515. The shape of the transmitted PSD 505 and the received PSD 515 is shown purely for illustrative purposes and should not be considered limiting. Transmit PSDs 505 can be distorted by a system or channel 510 in various ways to produce the received PSD 515. In some implementations, the channel or system 510 can also not be frequency selective.

Figure 5B:
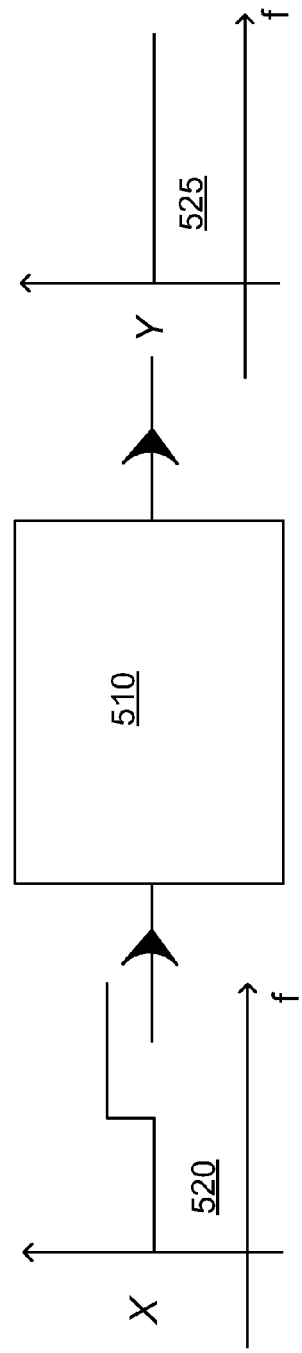

In some implementations, transmit power control can be used to mitigate or reduce the effect of spectral shaping introduced by the system or channel 510. An example of such a power control scheme is shown in FIG. 5B. If a flat PSD is desired at the receiver, the transmit PSD 520 can be suitably controlled to achieve such a received PSD 525. In some implementations, the knowledge of the uncontrolled transmit PSD 505 and received PSD 515 can be used in determining the transmit PSD profile 520. In this example, the transmit PSD profile 520 is acted upon by the system or channel 510 to produce the desired received PSD 525. In some implementations, channel estimation can be performed to determine the nature of the channel or system 510.

Referring again to FIG. 4, operations may further include modulating at least a portion of a data packet in accordance with the adjusted spectral density (step 415). In some implementations, the data packets can be in the form of Physical Protocol Data Units (PPDU). The data packet is a physical layer signal that is transmitted on the communication medium. The data packet may include several parts or fields. For example, the data packet format that is used by home networking technologies (for example, HomePlug AV) includes a preamble, a frame header, and a payload. The preamble and the frame header may together be referred to as overhead information.

The preamble may be used for functions such as adjustable gain controller (AGC), demarcation of the start of the packet, and physical symbol synchronization. The frame header includes header information such as a source address, a destination address, channel adaptation information for the payload, duration of the payload and header check sequence to determine the integrity of the header. The frame header may contain other information including but not limited to status update on a sender, information to be transmitted to other nodes in a network and parameters related to an error correction technique. In some cases, the frame header is transmitted in a broadcast mode so that all stations or nodes can receive the header information and react appropriately. Some of the header information may be used by the receiver to interpret the payload. Other portions of the header information may be used to provide status information to the receiver or to other nodes in the network. The payload may contain application data or management information that is exchanged between the transmitter and the receiver. In some cases, the payload is modulated based on unique channel characteristics between the transmitter and the receiver. In some implementations, at least a portion of the overhead information is modulated in the frequency band whose PSD has been adjusted. In some cases, at least a portion of the overhead information is transmitted in a frequency band with sufficiently high PSD such that the overhead information is received by a plurality of receivers in the network. In some implementations, at least a portion of the payload is also modulated in the frequency band whose PSD has been adjusted.

In some cases, the overhead information is transmitted using the same physical layer encoding as the payload. In other cases, the overhead information is encoded in a manner so as to provide higher reliability of reception. This improvement in reliability of the overhead information (relative to the payload) can be achieved in several ways. One approach is to repeat the overhead information multiple times. Since multiple copies of the overhead information are present, the receiver has a high probability of receiving the overhead information even when one or more copies of the overhead information get corrupted. In some implementations, the header fields are encoded with a robust error correction technique such as forward error correction (FEC) technique. The overhead information may be modulated using relatively conservative parameters compared to the payload. For example, the overhead information may be transmitted with a higher PSD as compared to the payload. In some implementations, some carriers within an OFDM signal may be used for encoding the overhead information while other carriers within the same OFDM signal may be used for encoding a part of the payload.

Any type of modulation technique may be used for modulating one or more of the payload and the overhead information. In some implementations, analog modulation techniques such as amplitude modulation (AM), frequency modulation (FM) or phase modulation (PM) may be used. In other implementations, one or more digital modulation techniques may also be employed. Examples of such modulation techniques include, without limitation, phase shift keying (PSK), frequency shift keying (FSK), amplitude shift keying (ASK) and quadrature amplitude modulation (QAM). In QAM, an in-phase signal and a quadrature-phase signal are amplitude modulated and combined. The number of symbols in a QAM scheme may be decided based on design parameters and/or one or more estimated characteristics of a channel. In some implementations, a combination of a plurality of modulation schemes may also be used. For example, in one implementation, a part of the overhead information may be modulated using 16-QAM while another part of the overhead information is modulated using 256-QAM. In some implementations, the payload and the overhead information may be encoded using different modulation techniques. For example, the payload may be modulated using a less robust technique such as 256-QAM while one or more parts of the overhead information are encoded using a more robust modulation scheme such as 16-QAM or even BPSK. Irrespective of the modulation scheme used, the transmit power is determined in accordance with the adjusted transmit PSD. In some implementations, the transmit PSD may be further adjusted in accordance with the modulation scheme being used.

Maintaining Connectivity with Transmit Power Control

In some networks, it is of importance to maintain connectivity with a plurality of nodes in order to function properly. For example, in networks employing carrier sense multiple access (CSMA) as one of the channel access mechanisms, nodes must be able to determine if the channel is idle before proceeding with a transmission. In other words, a transmitter should be able to detect any ongoing transmissions on the channel before it can transmit any data. In such a network, avoiding hidden nodes is beneficial in effective functioning of the network.

Figure 6A:
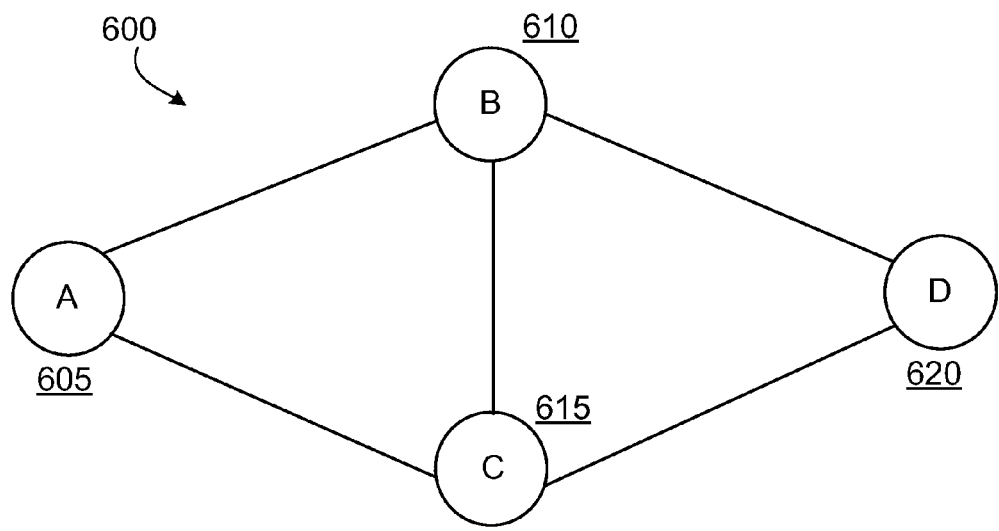
FIGS. 6A-6B are schematic diagrams of communication networks.

Referring now to FIG. 6A, an example of a network 600 with a hidden node scenario is depicted. In this example node D 620 is hidden from node A 605. When node A 605 is transmitting to node B 610 and node D 620 wants to transmit to node C 615, there are no means for node D 620 to determine that a transmission is occurring in the network 600. If node D 620 goes ahead with its transmission, it can interfere with the transmission between node A 605 and node B 610. In some implementations, reducing the transmit power level can result in an increased number of hidden nodes in the network. This in turn can reduce network efficiency. When employing transmit power control, it is therefore of interest to maintain connectivity with other nodes in the network.

Figure 6B:
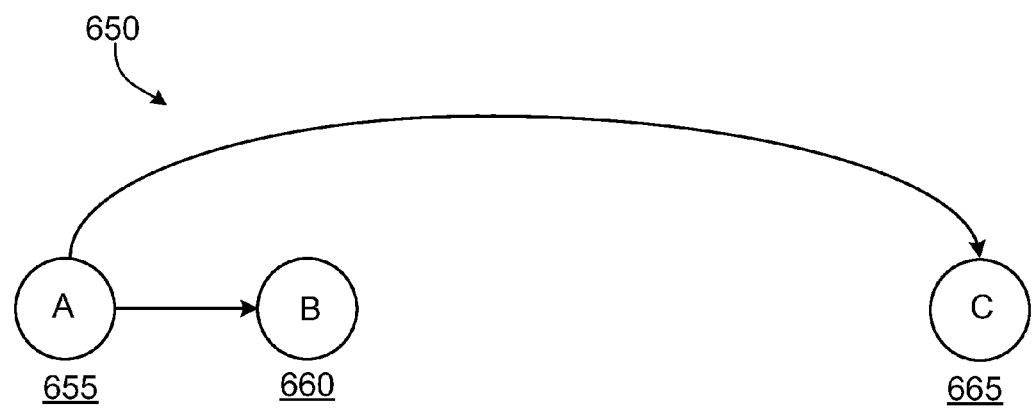

Referring to FIG. 6B, an example solution to avoiding hidden nodes in a network 650 is depicted. In this example, the node A 655 may want to reduce transmit power by X db when communicating with or transmitting to node B 660. In order to maintain connectivity with a distant node C 665, node A 655 adjusts the transmit power while ensuring that node C 665 can continue to hear the adjusted low power transmissions. In some implementations, node A 655 can further adjust the transmit PSD to determine a new reduced power level suitable for maintaining connectivity with node c 665. In some implementations, a node detects an ongoing transmission if it is able to detect at least a part of the overhead information such as the preamble and/or the frame control.

In some implementations, the problem of hidden nodes can be circumvented by implementing a channel access mechanism such as the request to send/clear to send (RTS/CTS) mechanism in conjunction with transmit power control. Referring back to FIG. 6A, in an exemplary operation of such a mechanism, node A 605 polls node C 615 to check if node C 615 can receive a reduced power transmission from node A 605. The advantage of this approach is that it is substantially conclusive in determining that network connectivity is maintained. In other words, no extrapolation or assumptions are usually necessary in determining whether connectivity is maintained. In this approach, node C 615 will only respond if it indeed receives or hears the reduced power transmissions from node A 605. However, this approach, which is also known as an active approach, can have associated costs of occupying the channel for some time, in order to determine whether connectivity is maintained.

In some implementations, instead of actively checking whether a node can hear a reduced power transmission, the transmitter can estimate a feasible level of power reduction. In general, the better a link is the more power reduction it can withstand. In general, a transmitter may determine that there is sufficient SNR margin to one or more other nodes in the network such that connectivity can be maintained with those nodes after the transmission power is reduced, before reducing the transmission power. In some implementations, tone maps can be used as indicators of link quality in estimating the level of possible power reduction. In some implementations, tone map based lookup tables as shown below can be used. In this example, it is assumed that A<B<C, and x1<x2<x3.

| Supported data rate as per tone map | Maximum possible power reduction |
|---|---|
| A Mbps | x1 dB |
| B Mbps | x2 dB |
| C Mbps | x3 dB |

In some implementations, each transmitter in a network transmits a special signal, such as a discover beacon, at a preset time interval. The reception of these beacons at another node or receiver can be used by that station to maintain a "discovered station and network list". In some implementations, the received discover beacon also indicates the quality of the link from the transmitter to the receiving station. In the example shown in FIG. 6B, node A 655 can estimate the link quality between node A 655 and node C 665 by examining the discover beacon received from node C 665. This estimate of the link quality can be used by node A 655 to determine how much transmit power reduction can be applied before node C 665 cannot hear the transmissions any more.

Isolating Neighboring Networks Using Transmit Power Control

Figure 7A:
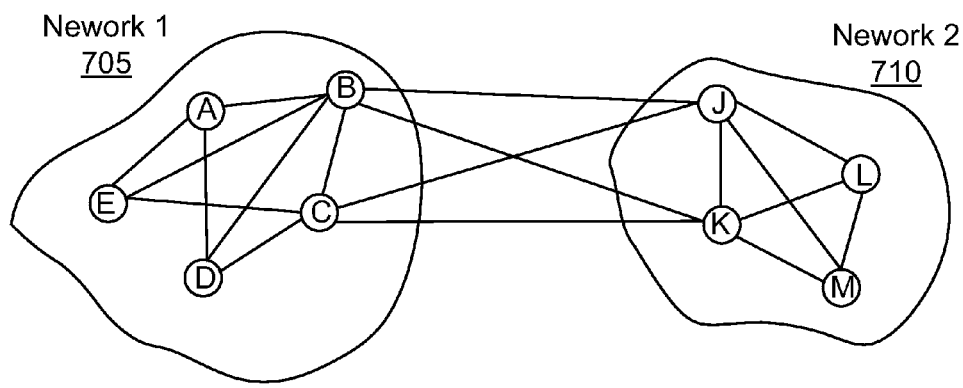
FIGS. 7A-7B are schematic diagrams of communication networks.

In some implementations, transmit power control can increase spatial reuse by neighboring networks. Referring now to FIG. 7A, an example of neighboring networks 705 and 710 is shown. In this example, nodes A, B, C, D and E are a part of a first network 705 and nodes J, K, L, and M are a part of a second network 710. The solid lines between nodes describe the connectivity of the nodes when no transmit power control is used. In this example, it can be seen that nodes B and C of the first network 705 can hear transmissions by nodes J and K of the second network 710. This results in nodes B, C and nodes J, K sharing the channel in time while using a channel access mechanism such as CSMA.

Figure 7B:
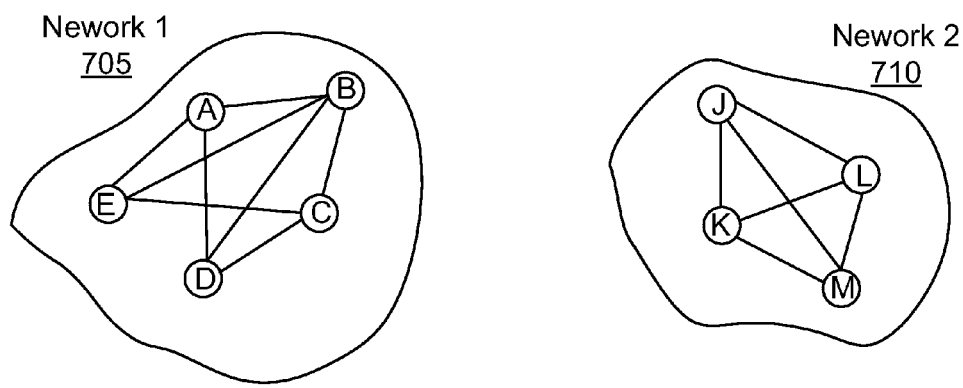

In some implementations, when transmit power control is implemented, neighboring networks can be isolated from each other. This is illustrated in FIG. 7B. In this example, the connectivity between the networks 705 and 710 are as shown in FIG. 7B. The transmit powers of node B, C, J and K are adjusted such that there is no connectivity between the network 705 and the network 710. In such a case, transmissions by nodes in one network (for example, the first network 705) do not interfere with transmissions in another network (for example, the second network 710). This results in increased channel usage also known as spatial reuse. Since transmissions from node B and node C do not interfere with transmissions by nodes J and nodes K, all such transmissions can occur simultaneously, thereby increasing spatial reuse. In some implementations, transmit power control does not always result in two isolated networks. Depending on the topology of the network, the number of interfering transmissions can decrease substantially, thereby increasing spatial channel reuse.

Transmit Power Control in Simplified Nodes

In some implementations, such as in power line networks, the nodes communicate with each other using a fixed set of tone maps. In some cases, these tone maps are not channel adapted. Such tone maps are designed to be robust enough to operate reliably over poor channel conditions. Typically, these tone maps have significant SNR margin. In other words, the quality of the signal at the receiver is significantly better than what is needed for reliable reception. The mode of operation of the nodes in such cases may be referred to as a robust mode. In robust modes, it is possible to reduce the transmit power level and continue operating reliably. In such cases, transmit power control can reduce emissions significantly, increase the power savings, reduce interference with other networks and provide increased spatial reuse in neighboring networks as described above.

Transmit power reduction in robust modes may increase the number of hidden nodes in networks. This results in reduced network throughput. Therefore, it is of interest to maintain connectivity within the same network in conjunction with implementing transmit power control. Transmit power control can be achieved in the robust mode in various ways In some implementations, a transmitter can monitor the effectiveness of the transmissions using a particular power level to determine whether to reduce the power or increase it. Metrics such as a packet success rate (PSR) can be used to measure the effectiveness of the transmissions. In some implementations, such monitoring can be on a per transmission basis. In some implementations, such monitoring can be on a per node basis. In some implementations, the per node basis monitoring can be done using feedback information (for example, SACK packets) provided by the receiving node about the status of reception of data packets.

Typically, a transmitting node can reduce the transmit power to a particular node as long as the PSR is sufficiently high. However, maintaining the network connectivity is also of importance. To achieve this, in some implementations, the transmitting node may reduce the transmit power in steps and for each reduced power level, check for the network connectivity by transmitting data to each node in the network and observing the PSR. In general, the transmitting node can reduce the transmit power as long as the network connectivity is maintained.

In some implementations, where a transmitting node sends data using any of the fixed tone maps, the receiver node can estimate a SNR margin available on each carrier frequency. In some implementations, the receiver node can provide feedback to the transmitter about the amount of power reduction possible. The transmitter can gather this information from all the nodes in the network and determine the power level to be used so that connectivity is maintained with all the nodes in the network.

In some implementations, such as in power line networks, nodes periodically broadcast management packets (for example, discover beacons in HomePlug AV). A transmitting node can monitor these transmissions from each of the node in the network and estimate the amount of possible transmit power reduction to a particular destination node. The transmitting node can use these estimates and determine the level to which it can decrease the transmit power level such that network connectivity is maintained.

The techniques described above can be implemented using software for execution on a computer system. For instance, the software defines procedures in one or more computer programs that execute on one or more programmed or programmable computer systems (e.g., desktop, distributed, client/server computer systems) each including at least one processor, at least one data storage system (e.g., including volatile and non-volatile memory and/or storage elements), at least one input device (e.g., keyboard and mouse) or port, and at least one output device (e.g., monitor) or port. The software may form one or more modules of a larger program.

The software may be provided on a computer-readable storage medium, such as a CD-ROM, readable by a general or special purpose programmable computer or delivered over a medium (e.g., encoded in a propagated signal) such as network to a computer where it is executed. Each such computer program is preferably stored on or downloaded to a storage medium (e.g., solid state memory or media, or magnetic or optical media) readable by a general or special purpose programmable computer, for configuring and operating the computer system when the storage medium is read by the computer system to perform the procedures of the software.

While various implementations have been illustrated and described in the present application, it is not intended that these implementations illustrate and describe all possible embodiments. Rather, the words used in the specification are words of description rather than limitation, and it is understood that various changes may be made without departing from the spirit and scope of the invention. Many other implementations other than those described above are within the scope of the invention, which is defined by the following claims.

What is claimed is:

1. A method for communicating among nodes in a network, the method, comprising:
   determining, by a transmitter, a first frequency band and at least a second frequency band to be used for communicating data packets, wherein a maximum allowable power spectral density in the first frequency band is greater than a maximum allowable power spectral density in the second frequency band;
   adjusting power spectral density for a first group of frequencies in the first frequency band such that the adjusted power spectral density of the first group does not exceed the maximum allowable power spectral density of the first frequency band and a quantization noise introduced by the transmitter is less than a threshold value for a signal transmitted in the second frequency band; and
   modulating at least a portion of a data packet transmitted by the transmitter to at least a first receiver in accordance with the adjusted power spectral density,
   wherein the power spectral density is adjusted such that at least a second receiver is able to receive overhead information of the data packet.

2. The method of claim 1, wherein the data packet transmitted by the transmitter includes a payload and the overhead information.

3. The method of claim 2 wherein at least a portion of at least one of the payload or the overhead information is transmitted in the first frequency band.

4. The method of claim 1, wherein the second receiver is configured to determine from the overhead information whether the transmitter is communicating with at least the first receiver.

5. The method of claim 1 further comprising determining, by the transmitter, a minimum power level for transmitting the overhead information such that at least the second receiver is able to receive the overhead information.

6. The method of claim 5 further comprising monitoring, by the transmitter, at least some transmissions to or from other nodes in the network, the other nodes including at least the first and second receivers, to determine if the other nodes are able to receive the overhead information.

7. The method of claim 1, further comprising adjusting power spectral density for a second group of frequencies in the second frequency band such that the adjusted power spectral density in the second group does not exceed the maximum allowable power spectral density of the second frequency band.

8. The method of claim 7, wherein the first group includes the entire first frequency band, the second group includes the entire second frequency band and the adjustments made to the first group is substantially same as the adjustments made to the second group.

9. The method of claim 1, further comprising:
   determining, by the transmitter, a third frequency band to be used for communicating the data packets, wherein a maximum allowable power spectral density in the third frequency band is less than the maximum allowable power spectral density in the second frequency band; and
   adjusting power spectral density for at least one of the first and second groups of frequencies such that the quantization noise introduced by the transmitter is less than a second threshold value for a signal transmitted in the third frequency band.

10. The method of claim 1, wherein the quantization noise is introduced by a digital to analog converter of the transmitter.

11. The method of claim 10, wherein the same digital to analog converter is used for signals both in the first and second frequency bands.

12. The method of claim 1, where the power spectral density for the first group is further adjusted to increase a data rate between the transmitter and the first receiver in accordance with a characteristic of a channel between the transmitter and the first receiver.

13. The method of claim 1 wherein the power spectral density for the first group is further adjusted such that a second quantization noise introduced by an analog to digital converter in the first receiver is below a third threshold.

14. The method of claim 1, wherein the power spectral density for the first group is further adjusted such that transmissions within the network are not received by at least one node in a neighboring second network.

15. The method of claim 1, wherein the power spectral density for the first group is further adjusted based on available a priori information about the network.

16. The method of claim 15, wherein the a priori information includes one or more of a nature of a link between two nodes in the network, signal to noise ratios (SNR) of various carrier frequencies between the nodes in the network, modulation schemes to be used for each carrier frequency, a code rate and a guard interval to be used by the transmitter, and limitations of hardware used in the network.

17. The method of claim 1, wherein the power spectral density for the first group is further adjusted based on feedback information received from at least the first receiver, the feedback information indicating a need to either increase or decrease transmit power.

18. The method of claim 1, wherein the transmitter is incorporated in a network interface module of a first station and the first receiver is incorporated in a network interface module of a second station.

19. A system for communicating among nodes in a network, the system comprising:
   a transmitter, configured to:
      determine a first frequency band and at least a second frequency band to be used for communicating data packets, wherein a maximum allowable power spectral density in the first frequency band is greater than a maximum allowable power spectral density in the second frequency band;
      adjust power spectral density for a first group of frequencies in the first frequency band such that the adjusted power spectral density of the first group does not exceed the maximum allowable power spectral density of the first frequency band and a quantization noise introduced by the transmitter is less than a threshold value for a signal transmitted in the second frequency band; and
      modulate at least a portion of a data packet transmitted to at least a first receiver in accordance with the adjusted power spectral density,
      wherein the power spectral density is adjusted such that at least a second receiver is able to receive overhead information of the data packet.

20. The system of claim 19, wherein the data packet includes a payload and the overhead information.

21. The system of claim 20 wherein at least a portion of at least one of the payload or the overhead information is transmitted in the first frequency band.

22. The system of claim 19, further comprising:
the second receiver, configured to determine from the overhead information whether the transmitter is communicating with at least the first receiver.

23. The system of claim 19, wherein the transmitter is further configured to determine a minimum power level for transmitting the overhead information such that at least the second receiver is able to receive the overhead information.

24. The system of claim 23, wherein the transmitter is further configured to monitor at least some transmissions to or from other nodes in the network, the other nodes including at least the first and second receivers, to determine if the other nodes are able to receive the overhead information.

25. The system of claim 19, wherein the transmitter is further configured to adjust power spectral density for a second group of frequencies in the second frequency band such that the adjusted power spectral density in the second group does not exceed the maximum allowable power spectral density of the second frequency band.

26. The system of claim 25, wherein the first group includes the entire first frequency band, the second group includes the entire second frequency band and the adjustments made to the first group is substantially same as the adjustments made to the second group.

27. The system of claim 19, wherein the transmitter is further configured to:
determine a third frequency band to be used for communicating the data packets, wherein a maximum allowable power spectral density in the third frequency band is less than the maximum allowable power spectral density in the second frequency band; and
adjust power spectral density for at least one of the first and second groups of frequencies such that the quantization noise introduced by the transmitter is less than a second threshold value for a signal transmitted in the third frequency band.

28. The system of claim 19, wherein the quantization noise is introduced by a digital to analog converter of the transmitter.

29. The system of claim 28, wherein the same digital to analog converter is used for signals both in the first and second frequency bands.

30. The system of claim 19, where the power spectral density for the first group is further adjusted to increase a data rate between the transmitter and the first receiver in accordance with a characteristic of a channel between the transmitter and the first receiver.

31. The system of claim 19 wherein the power spectral density for the first group is further adjusted such that a second quantization noise introduced by an analog to digital converter in the first receiver is below a third threshold.

32. The system of claim 19, wherein the power spectral density for the first group is further adjusted such that transmissions within the network are not received by at least one node in a neighboring second network.

33. The system of claim 19, wherein the power spectral density for the first group is further adjusted based on available a priori information about the network.

34. The system of claim 33, wherein the a priori information includes one or more of a nature of a link between two nodes in the network, signal to noise ratios (SNR) of various carrier frequencies between the nodes in the network, modulation schemes to be used for each carrier frequency, a code rate and a guard interval to be used by the transmitter, and limitations of hardware used in the network.

35. The system of claim 19, wherein the power spectral density for the first group is further adjusted based on feedback information received from at least the first receiver, the feedback information indicating a need to either increase or decrease transmit power.

36. A method for communicating among nodes in a network, the method comprising:
transmitting signals at various available power levels to another node in the network; and
receiving corresponding tone maps from said another node in response to transmitting the signals at various available power levels, wherein each corresponding tone map is associated with one of a set of possible data rates;
determining, by a transmitter, a data rate to be used for communicating data packets with at least a first receiver in the network, wherein the data rate is chosen from the set of data rates associated with the corresponding tone maps;
adjusting power spectral density for a group of frequencies such that the adjusted power spectral density of the group does not exceed the maximum allowable power spectral density for the group; and
modulating at least a portion of a data packet transmitted by the transmitter to at least a first receiver in accordance with the adjusted power spectral density.

37. The method of claim 36, wherein the data packet transmitted by the transmitter includes a payload and overhead information.

38. The method of claim 37, wherein the power spectral density for the group of frequencies is adjusted such that at least a second receiver in the network is able to receive the overhead information.

39. The method of claim 37, wherein the power spectral density for the group of frequencies is further adjusted such that transmissions within the network are not received by at least one node in a neighboring second network.

40. The method of claim 37, wherein at least a portion of at least one of the payload or the overhead information is transmitted by the transmitter to at least the first receiver in accordance with the adjusted power spectral density.

41. The method of claim 36, wherein said adjusting the power spectral density includes estimating an amount of possible power reduction based upon a relative link quality associated with the corresponding tone maps.

42. A system for communicating among nodes in a network, the system comprising:
a transmitter, configured to:
transmit signals at various available power levels to another node in the network;
receive corresponding tone maps from said another node in response to the transmitter transmitting the signals at various available power levels, wherein each corresponding tone maps is associated with one of a set of possible data rates;
determine a data rate to be used for communicating data packets with at least a first receiver in the network, wherein the data rate is chosen from the set of data rates associated with the corresponding tone maps;
adjust power spectral density for a group of frequencies such that the adjusted power spectral density of the group does not exceed the maximum allowable power spectral density for the group; and
modulate at least a portion of a data packet transmitted to at least a first receiver in accordance with the adjusted power spectral density.

43. The system of claim 42, wherein the transmitter is configured to estimate an amount of possible power reduction based upon a relative link quality associated with the corresponding tone maps.

44. A method for communicating among nodes in a network, the method, comprising:
- determining, by a transmitter, a first frequency band and at least a second frequency band to be used for communicating data packets, wherein a maximum allowable power spectral density in the first frequency band is greater than a maximum allowable power spectral density in the second frequency band;
- adjusting power spectral density for a first group of frequencies in the first frequency band such that the adjusted power spectral density of the first group does not exceed the maximum allowable power spectral density of the first frequency band and a quantization noise introduced by the transmitter is less than a threshold value for a signal transmitted in the second frequency band, wherein the power spectral density for the first group is further adjusted such that transmissions within the network are not received by at least one node in a neighboring second network; and
- modulating at least a portion of a data packet transmitted by the transmitter to at least a first receiver in accordance with the adjusted power spectral density.

45. A system for communicating among nodes in a network, the system comprising:
- a transmitter, configured to:
  - determine a first frequency band and at least a second frequency band to be used for communicating data packets, wherein a maximum allowable power spectral density in the first frequency band is greater than a maximum allowable power spectral density in the second frequency band;
  - adjust power spectral density for a first group of frequencies in the first frequency band such that the adjusted power spectral density of the first group does not exceed the maximum allowable power spectral density of the first frequency band and a quantization noise introduced by the transmitter is less than a threshold value for a signal transmitted in the second frequency band, wherein the power spectral density for the first group is further adjusted such that transmissions within the network are not received by at least one node in a neighboring second network; and
  - modulate at least a portion of a data packet transmitted to at least a first receiver in accordance with the adjusted power spectral density.

46. A non-transitory computer readable medium storing instructions which, when executed by one or more processors of a device, cause the device to perform operations comprising:
- determining, by a transmitter in a network, a first frequency band and at least a second frequency band to be used for communicating data packets, wherein a maximum allowable power spectral density in the first frequency band is greater than a maximum allowable power spectral density in the second frequency band;
- adjusting power spectral density for a first group of frequencies in the first frequency band such that the adjusted power spectral density of the first group does not exceed the maximum allowable power spectral density of the first frequency band and a quantization noise introduced by the transmitter is less than a threshold value for a signal transmitted in the second frequency band; and
- modulating at least a portion of a data packet transmitted by the transmitter to at least a first receiver in accordance with the adjusted power spectral density,
- wherein the power spectral density is adjusted such that at least a second receiver is able to receive overhead information of the data packet.

47. The non-transitory computer readable medium of claim 46, wherein the data packet transmitted by the transmitter includes a payload and the overhead information.

48. The non-transitory computer readable medium of claim 47, wherein at least a portion of at least one of the payload or the overhead information is transmitted in the first frequency band.

49. The non-transitory computer readable medium of claim 46, wherein the instructions further cause the device to perform operations comprising determining, by the transmitter, a minimum power level for transmitting the overhead information such that at least the second receiver is able to receive the overhead information.

50. The non-transitory computer readable medium of claim 49, wherein the instructions further cause the device to perform operations comprising monitoring, by the transmitter, at least some transmissions to or from other nodes in the network, the other nodes including at least the first and second receivers, to determine if the other nodes are able to receive the overhead information.

51. The non-transitory computer readable medium of claim 46, wherein the instructions cause the device to further adjust the power spectral density for the first group such that transmissions within the network are not received by at least one node in a neighboring second network.

52. The non-transitory computer readable medium of claim 46, wherein the instructions further cause the device to further adjust the power spectral density for the first group based on feedback information received from at least the first receiver, the feedback information indicating a need to either increase or decrease transmit power.

* * * * *